United States Patent [19]

Bongianni

[11] 3,864,647

[45] Feb. 4, 1975

[54] SUBSTANTIALLY LINEAR MAGNETIC DISPERSIVE DELAY LINE AND METHOD OF OPERATING IT

[75] Inventor: Wayne L. Bongianni, Placentia, Calif.

[73] Assignee: Rockwell International Corporation, El Segundo, Calif.

[22] Filed: Dec. 26, 1973

[21] Appl. No.: 428,505

[52] U.S. Cl. ....... 333/30 M, 333/24 R, 340/174 MS

[51] Int. Cl. ...... H03h 9/30, H03h 9/32, G11c 11/16

[58] Field of Search ....... 333/29, 30 R, 30 M, 31 R, 333/71, 24.1, 24.2, 24.3; 117/234–240; 340/174 MS

[56] References Cited

UNITED STATES PATENTS

| | | | |
|---|---|---|---|
| 2,883,629 | 4/1959 | Suhl | 333/24.2 X |
| 2,958,055 | 10/1960 | Rowen | 333/24.2 X |
| 3,072,869 | 1/1963 | Seidel | 333/24.2 X |
| 3,811,941 | 5/1974 | Morgenthaler | 117/234 |

*Primary Examiner*—James W. Lawrence
*Assistant Examiner*—Marvin Nussbaum
*Attorney, Agent, or Firm*—H. Frederick Hamann; G. Donald Weber, Jr.; Robert Ochis

[57] ABSTRACT

Nondispersive and linearly dispersive magnetic delay lines are disclosed. The delay lines employ layers of magnetic-wave-active material spaced from each other and a layer of magnetic-wave-propagation-modifying material by intervening layers of magnetic-wave-inactive material. Characteristics of the biasing magnetic field and methods of operating the delay lines are also discussed.

5 Claims, 11 Drawing Figures

SUBSTANTIALLY LINEAR MAGNETIC DISPERSIVE DELAY LINE AND METHOD OF OPERATING IT

The invention herein described was made in the course of or under a contract, with the Air Force.

BACKGROUND OF THE INVENTION

1. Field of the Invention

The invention relates to the field of high frequency dispersive delay lines and, more particularly, to the field of high frequency magnetic dispersive delay lines.

2. Prior Art

Prior art high frequency dispersive delay lines have relied on surface acoustic wave phenomena. Wave propagation in an acoustic medium occurs through physical movement of the atoms in a crystal lattice about their equilibrium point. Unfortunately acoustic propagation on the surface is inherently extremely lossy at very high frequencies (500 MHz - 10 GHz). Due to inertia and other effects, this method of propagation becomes more lossy the higher the frequency.

In contrast to acoustic phenomena, the magnetic spin wave phenomena does not depend on vibration of the crystal lattice atoms about their equilibrium positions. Instead, the spin wave phenomena depends on rotational vibration of the spin axis of an atom having an unpaired spin. The vibration of the spin axis is rotational, rather than longitudinal and, thus, is not clearly as lossy as acoustic phenomena. As in acoustic systems, the loss goes up with frequency. However, about 1 GHz the loss is much less than in acoustic systems. For this reason magnetic phenomena have been attractive for use at high frequencies. Unfortunately, prior art magnetic delay lines have had a monotonic time delay versus frequency characteristic. This characteristic is not adaptable to either dispersive or nondispersive delay lines, since the delay is not linearly dependent on frequency (dispersive) or independent of frequency (nondispersive).

A further disadvantage of acoustic dispersive delay lines is that the frequency of operation thereof cannot be changed after transducer electrodes have been deposited on the surface acoustic wave medium. This has disadvantages in the many applications where it is desirable to be able to change the frequency of operation promptly and without downtime. Such applications include microwave pulse compression in radar, as well as in filtering applications.

SUMMARY OF THE INVENTION

The invention provides magnetic delay lines comprised of a plurality of layers which in combination exhibit a nonmonotonic delay-time versus frequency characteristics. These types of delay lines are produced by spacing a layer of magnetic-wave-active material from a layer of magnetic-wave-propagation-modifying material by a layer of magnetic-wave-inactive material. The delay line can be used to produce either linearly dispersive or nondispersive delays. Where a plurality of layers of magnetic-wave-active material are employed, the individual layers of magnetic-wave-active material have similar, preferably identical, characteristics in order to achieve optimum operation. The signal to be delayed is coupled into the magnetic-wave-active material, e.g., through a.c. coupling which induces an a.c. magnetic field adjacent the magnetic-wave-active medium thereby inducing a magnetic wave in the medium. At the output end of the delay line the magnetic wave is converted to an electric current by the magnetic lines of force cutting an output conductor.

A linearly dispersive delay line may be achieved by biasing a multiple magnetic-wave-active layer delay line with a magnetic field having a gradient substantially perpendicular to the surface of the magnetic layer whereby different layers of magnetic-wave-active material are subject to different magnetic fields. A three magnet configuration can be used to produce such a bias field.

In a preferred embodiment, layers of magnetic-wave-active of monocrystalline yttrium iron garnet (YIG) having substantially identical characteristics are grown on both sides of magnetic-wave-inactive monocrystalline gadolinium gallium garnet ($G^3$) substrates in a liquid epitaxy system.

Linearly dispersive delay lines with large time-bandwidth products are produced when a plurality of layers of magnetic-wave-active material are spaced from each other and a propagation modifying layer by layers of magnetic-wave-inactive material.

DETAILED DESCRIPTION OF THE PREFERRED EMBODIMENT

Figure 1:
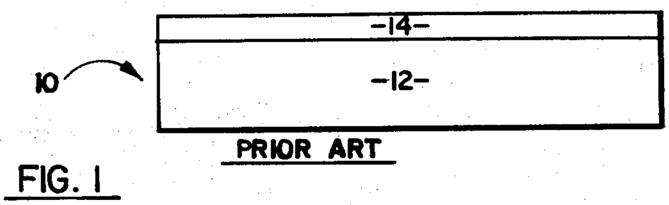
FIG. 1 is a cross-sectional view of the internal structure of a prior art magnetic delay line.
Figure 2:
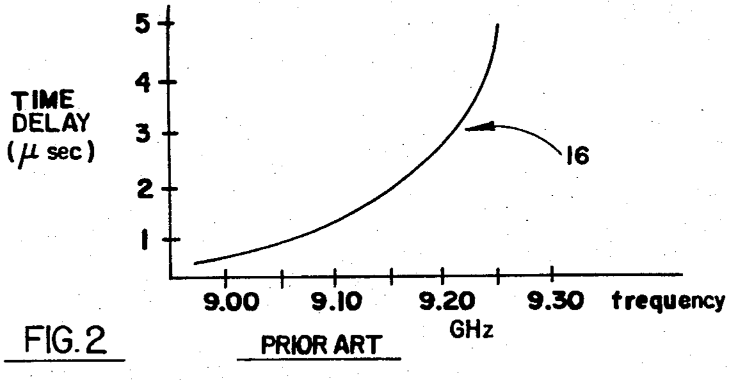
FIG. 2 illustrates the monotonic time-delay versus frequency characteristic of the prior art magnetic delay line of FIG. 1.

A prior magnetic delay line 10 is illustrated in cross-section in FIG. 1. Delay line 10 comprises a layer 14 of magnetic-wave-active material which may be disposed on a supporting layer 12 of magnetic-wave-inactive material. Prior art delay line 10 produces a monotonic time-delay versus frequency characteristic shown generally at 16 in FIG. 2. Delay lines having this characteristic are of no value for use as either linearly dispersive delay lines or nondispersive delay lines, since the time delay thereof is neither linear with frequency nor constant over a range of frequencies.

Figure 3:
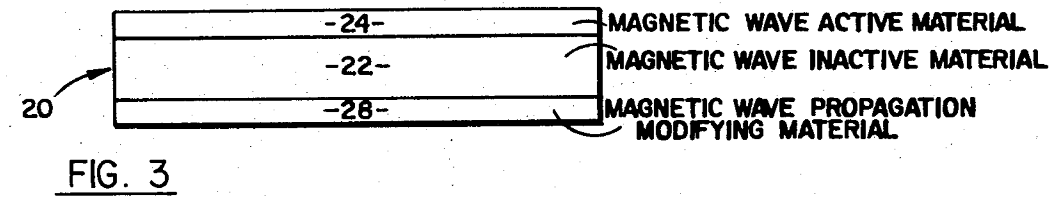
FIG. 3 is a cross-sectional view of a basic magnetic delay line in accordance with this invention which has a nonmonotonic time-delay versus frequency characteristic.
Figure 4:
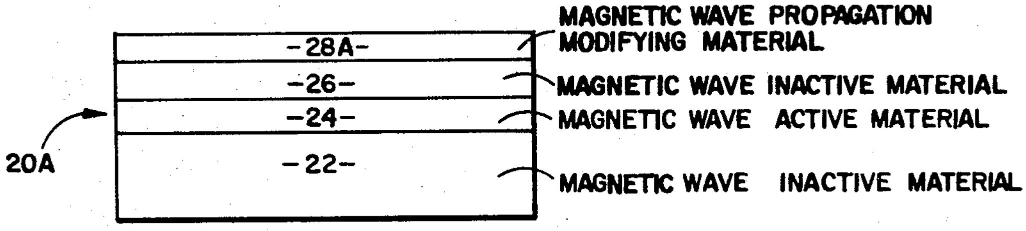
FIG. 4 is a cross-sectional view of an alternative structure for a delay line in accordance with this invention which has a nonmonotonic time-delay versus frequency characteristic.
Figure 5:
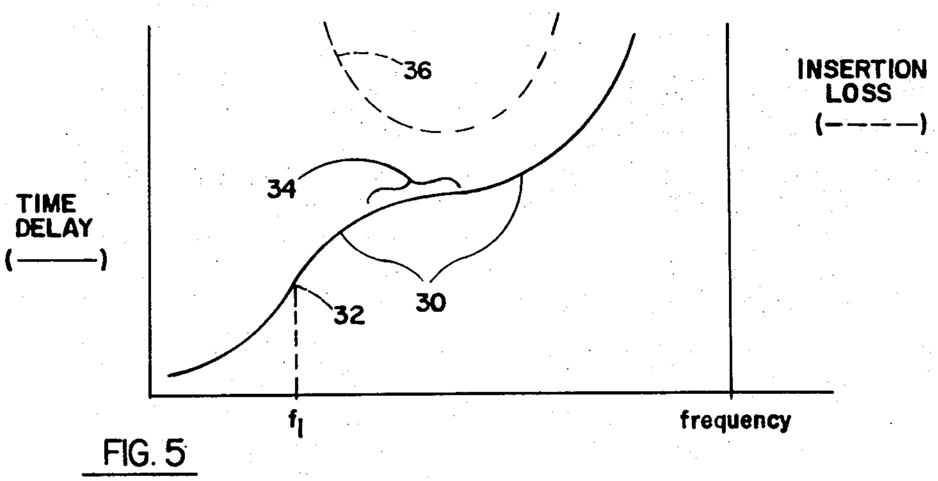
FIG. 5 is a time-delay versus frequency plot for the magnetic delay line of either FIG. 2 or FIG. 3.

Concurrent reference is now made to FIGS. 3, 4 and 5. By spacing layer 28 of magnetic-wave-propagation-modifying material from a layer 24 of magnetic-wave-active material by a thin layer 22 or 26 of magnetic-wave-inactive material a magnetic delay line 20 or 20A, respectively, is formed, having the time-delay versus frequency characteristic shown generally at 30 in FIG. 5. It will be noted that curve 30 has an inflection point 32 at frequency $f_1$. The presence of the inflection point 32 makes the design of a linearly dispersive delay line operating in the vicinity of frequency $f_1$ possible. A section of this time-delay versus frequency curve indicated generally at 34 is readily seen to be substantially nondispersive (time delay is substantially independent of frequency). The insertion loss of delay line 20 or 20A is indicated generally by the dashed line 36. It will be noted that the minimum insertion loss occurs in a nondispersive region of the time-delay versus frequency characteristic. Consequently, delay line 20 or 20A is not readily useable as a dispersive delay line because of the high and monotonically varying insertion loss in the vicinity of frequency $f_1$ at which inflection occurs.

The magnetic-wave-propagation-modifying is preferably conductive but may be formed of any material whose characteristics are such that the propagation of a magnetic wave in a magnetic-wave-active material in the vicinity of the magnetic-wave-propagation-modifying material is modified to produce a nonmonotonic time-delay versus frequency characteristic.

A preferred embodiment of delay line 20 comprises a monocrystalline layer 24 of a magnetic-wave-active material such as yttrium iron garnet (YIG) disposed on a surface of substrate 22 of a magnetic-wave-inactive material such as monocrystalline gadolinium gallium garnet (GGG). Layer 28 of an electrically conductive (or other magnetic-wave-propagation-modifying) material is on the other surface of substrate 22. Layers 24 and 28 may be formed on the surfaces of substrate 22 in any conventional manner such as chemical vapor deposition (CVD), liquid phase epitaxy (LPE) or the like. Moreover, the order of growth of the various layers of materials is limited only by the material techniques and processes desired. Alternatively, the delay line structure 20A of FIG. 3 may be formed by deposition of the layer 24 of magnetic-wave-active material on substrate 22, followed by deposition of the layer 26 of magnetic-wave-inactive material on layer 24 and deposition of conductive layer 28A on layer 26. If the alternative method is employed, layer 22 is not needed except as a support for the other layers. Dielectrics which are neither magnetically active nor magnetically lossy may serve as magnetic-wave-inactive material.

An external magnetic field must be applied parallel to the surface of the layer magnetic-wave-active material and perpendicular to the direction of propagation in order to propagate magnetic waves. This field may be provided by placing delay line structure 20 or 20A between the poles of a magnet or between two magnets having their unlike poles facing each other.

Figure 6:
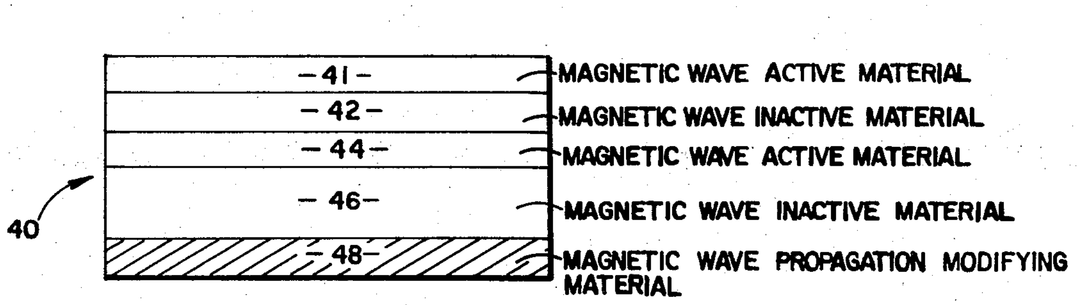
FIG. 6 is a cross-sectional view of a preferred embodiment of the linearly dispersive magnetic delay line of this invention.

Referring now to FIG. 6 there is shown a preferred embodiment of the linearly dispersive delay line of the instant invention. The structure of such a delay line is indicated generally at 40. A layer 48 of magnetic-wave-propagation-modifying material is separated from a first layer 44 of magnetic-wave-active material by a layer 46 of magnetic-wave-inactive material. A second layer 41 of magnetic-wave-active material is separated from the first layer 44 of magnetic-wave-active material by a second layer 42 of magnetic-wave-inactive material.

Figure 7:
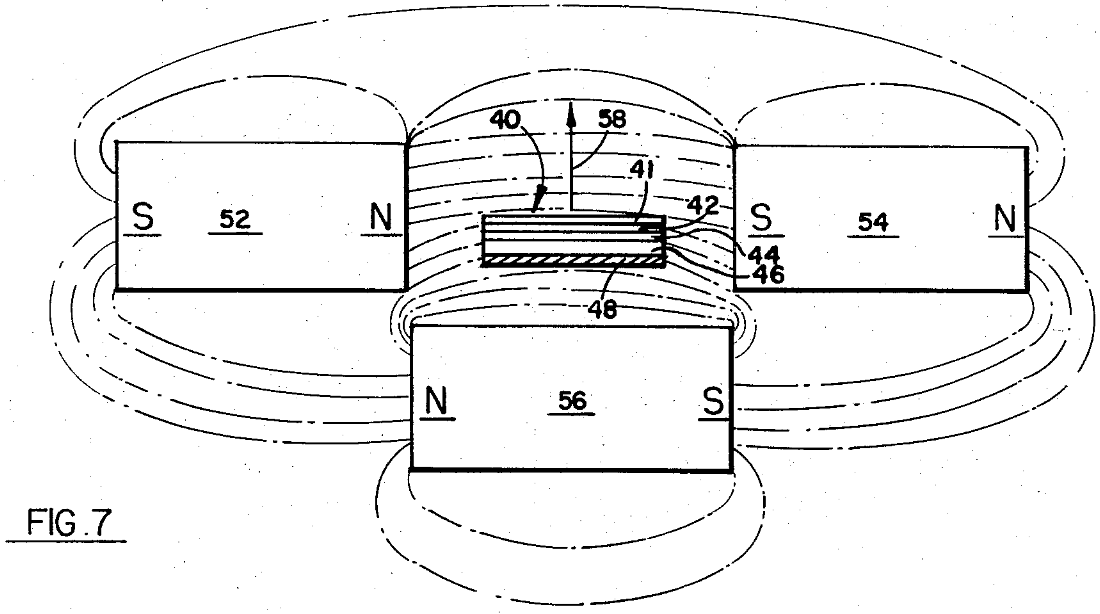
FIG. 7 illustrates the relative positions of three bias field magnets and the magnetic delay line stack in one bias field system.

In order to operate this delay line 40 as linearly dispersive delay line, the biasing magnetic field which is applied to the layered structure must have a gradient substantially perpendicular to the surface of the layered structure. A magnet configuration which will supply the necessary bias field is shown schematically in FIG. 7. In FIG. 7, three magnets 52, 54, and 56 are used to produce a magnetic field having the required characteristics in the vicinity of delay line structure 40. Magnets 52 and 54 are positioned adjacent opposite edges of delay line 40 with their pole faces parallel to the desired direction of propagation of the magnetic spin wave. Magnets 52 and 54 are positioned with opposite poles facing each other to produce a magnetic field perpendicular to the desired direction of propagation. A third magnet 56 is positioned below the other two magnets and delay line 40. Magnet 56 is positioned with the poles thereof under like poles of magnets 53 and 54 to produce a magnetic field through delay line 40 which distorts the substantially uniform field which would otherwise be produced by magnets 52 and 54. The magnetic field which results from this magnet configuration has a significant intensity gradient 58 perpendicular to the surface of the layered magnetic delay line structure. It will be understood that other magnet configurations which produce the necessary gradient may be employed and that either permanent or electromagnets may be used.

Figure 8:
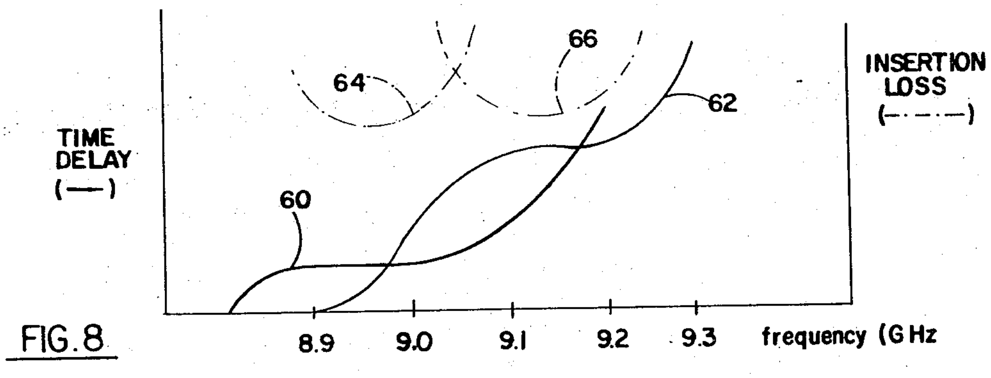
FIG. 8 is a time-delay versus frequency diagram illustrating the time-delay and insertion-loss versus frequency characteristics of each of the two layers of magnetic-wave-active material of the preferred embodiment in the absence of the other layer of magnetic material.

FIG. 8 is a plot of the time-delay versus frequency characteristics of each of the individual layers 41 and 44 of magnetic-wave-active material of multiple magnetic-wave-active layer delay line 40 shown in FIG. 6. The time-delay versus frequency characteristic curve 62 would be generated by layer 44 in the absence of layer 41. This response characteristic has an associated insertion-loss versus frequency characteristic indicated by dashed line 66. In the absence of layer 44, layer 41 would generate the time-delay versus frequency characteristic curve 60. Time-delay versus frequency characteristic 62 is displaced from time-delay versus frequency characteristic 60 in a direction of higher frequency and higher time delay as a result of the higher bias field to which layer 44 is subjected and its closer proximity to the ground plane, respectively. Dashed line 64 indicates the insertion-loss versus frequency characteristics of layer 41.

Figure 9:
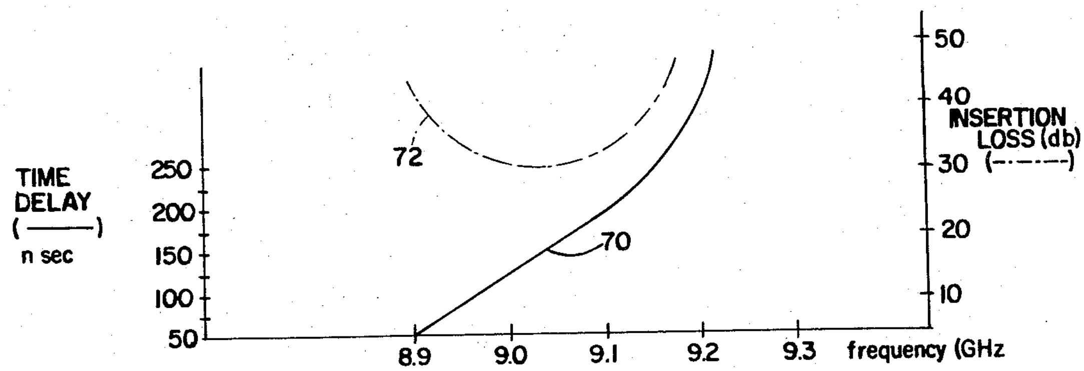
FIG. 9 is a time-delay versus frequency diagram illustrating the time-delay and insertion loss versus frequency characteristics of the preferred embodiment of the invention.

FIG. 9 illustrates, graphically, the unique benefits of this invention which result from magnetic intercoupling between layers 41 and 44. The overall time delay versus frequency characteristics of structure 40 is given by curve 70. This characteristic unexpectedly differs drastically from both curve 60 and curve 62. As can be seen, curve 70 has a highly linear dispersive characteristic over a significant frequency range. Of even further benefit for construction of linearly dispersive delay lines, the insertion loss versus frequency characteristic of delay line structure 40 as shown by dashed line 72 has a minimum substantially centered about the linearly dispersive region of curve 70.

Figure 10:
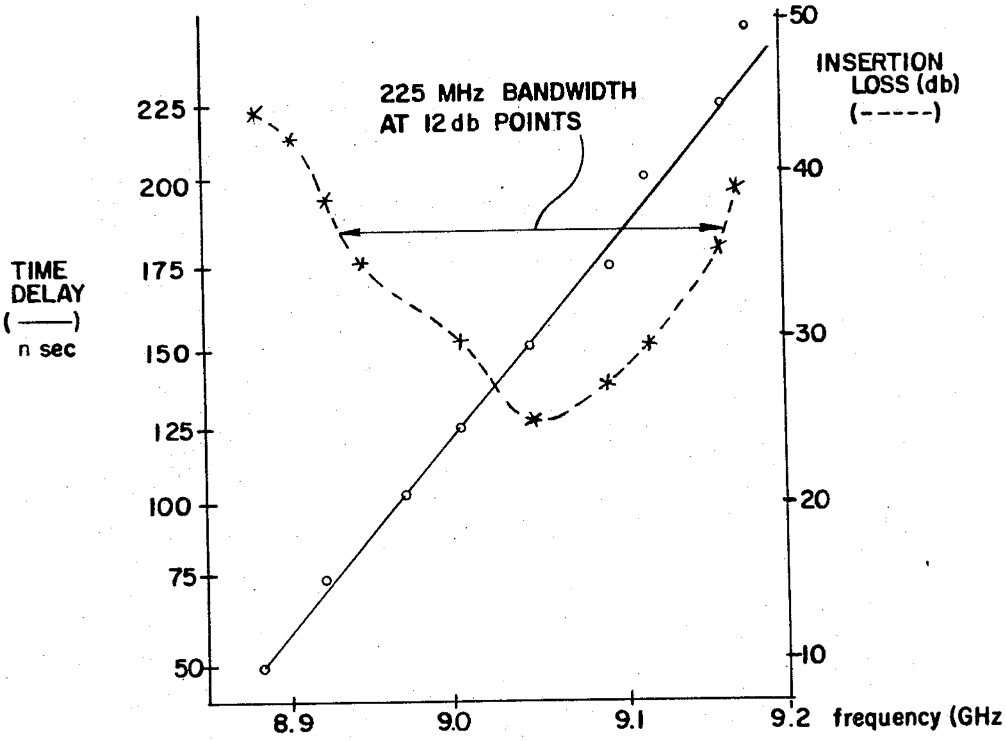
FIG. 10 illustrates measured values of time-delay and insertion-loss versus frequency for a delay line in accordance with the preferred embodiment of the invention.

FIG. 10 shows measure time-delay and insertion-loss versus frequency characteristics of a delay line. The data points were measured on an actual delay line of the configuration of delay line 40. The test delay line 40 has magnetic-wave-active layers 41 and 44 of monocrystalline yttrium iron garnet having a thickness of about 10 microns separated by a monocrystalline gadolinium garnet (GGG) substrate layer 22 which is about 25 mils thick. The magnetic-wave-propagation-modifying layer 48 is conductive and essentially a ground plane, and comprises a layer of copper approximately one-fourth inch thick. Layer 48 is separated from layer 44 by a dielectric layer 46 of alumina about 625 microns thick.

The time-delay and insertion-loss versus frequency characteristics of the delay line 40 shown in FIG. 6 is dependent on the thickness of the magnetic films or layers 41 and 44 and the quality of the crystal structure thereof. The magnetic films must have substantially identical characteristics for the proper coupling operation which is needed in order to produce linear dispersion. If the magnetic-wave-active layers are not substantially identical, the response of the less lossy layer will tend to swamp the response of the more lossy layer which minimizes beneficial coupling. Due to the importance of the film thickness and characteristics, it is preferred to grow the YIG layers in a liquid phase epitaxy (LPE) system in which both layers grow simultaneously at a uniform rate on opposite sides of the GGG substrate. Dielectric layer 46 and ground plane 48 may then be added for any suitable technique and process.

Figure 11:
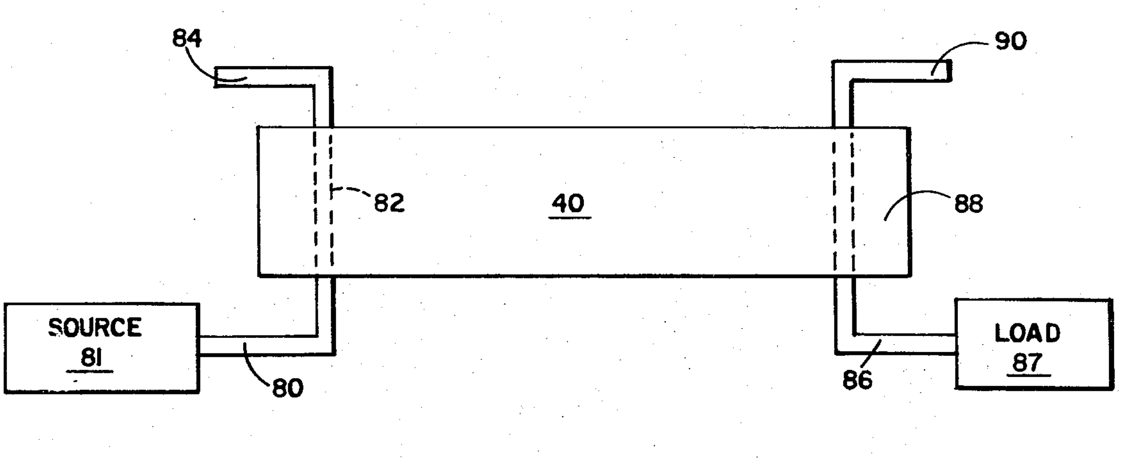
FIG. 11 illustrates suitable input and output coupling networks for use with the delay line of this invention.

A system for coupling signals to this delay line is shown in FIG. 11. An open-ended input transmission line 80 is connected to a suitable source 81. The delay line structure 40 is placed across the transmission line 80 at a point 82 one-half wave length from the open end 84 of the transmission line. The wavelength is that obtained in transmission line 80 by a signal having a frequency within the linearly dispersive region of curve 70 of FIG. 8. This arrangement of input line and delay line 40 results in maximum amplitude current adjacent the delay line 40 and, thus, induces a maximum amplitude magnetic field adjacent the delay line for a given excitation power. The induced magnetic field induces oscillation of the magnetic spin vectors of the iron atoms in the YIG layers 41 and 44. It is this oscillation which propagates down the delay line 40 as a magnetic wave.

An output transmission line 86, similar to input line 80, is used as a pickup at the output end of delay line 40. In this instance, the high frequency magnetic field generated by the oscillating spin vectors of the magnetic-wave-active material induces an electric current in the output transmission line at point 88. As with the input transmission line, the delay line 40 is placed one-half wavelength from the open end 90 of output transmission line 86. This input/output coupling system is frequency sensitive in that the delay line 40 overlies a high current region of each transmission line. However, where high current regions of the transmission lines are located depends on the excitation frequency, since the half-wave length of the signal is a function of its frequency. If the delay line is positioned in full wavelength from the end of the transmission line minimum coupling takes place. In the event it is desired to be able to vary the operating frequency of the delay line, the input and output transmission lines may be electrically connected to a ground plane and the delay line placed across the lines as close to the ground plane as possible. Under these conditions, for all frequencies the maximum current will appear adjacent the delay line, since there is always a region of maximum current at the shorted end of a transmission line.

The frequency range over which linear dispersion is produced varies with the strength of the magnetic bias field and therefore is controllable. The time-bandwidth product of the linear dispersive portion of the time-delay versus frequency curve of the delay line can be further expanded by adding additional alternating layers of dielectric and magnetic-wave-active materials. It is important that the magnetic material layers have substantially identical characteristics. It is not necessary that the magnetic-wave-active materials be deposited directly on the dielectric as far as the operation of the delay line is concerned. Any small gaps resulting from spaces between the magnetic active material and the adjacent dielectric will not have a significant effect on the overall characteristics of the delay line.

Magnetic layers 41 and 44 may be formed of any material which is capable of transmitting magnetic waves so as to provide a useable output signal. For optimum operation, a biasing magnetic field is needed which is substantially uniform in the plane of the layers of magnetic-wave-active material, but which has a substantial gradient perpendicular to the plane of the layers. Because of the inherent characteristics of magnetic fields, this ideal biasing field is presently unattainable since an actual magnetic field will have gradients in both directions. Consequently, magnetic field non-uniformities within a single layer tend to produce coupling within the layer, however, the resulting characteristics are not as useful as are those of a multiple magnetic-wave-active layer structure.

Thus, there has been described a preferred embodiment of a substantially linear magnetic dispersive delay line having unexpectedly desirable characteristics. The delay line described herein is intended to be illustrative only. The scope of the invention is intended to be limited only by the scope of the appended claims.

I claim:

1. In combination, a magnetic delay line comprising:
a layer of electrically conductive material;
at least one layer of magnetic-wave-inactive material;
a plurality of layers of magnetic-wave-active material comprised of yttrium iron garnet disposed in stacked relation, and;
at least one of said layers of magnetic-wave-active material being spaced apart from another layer of magnetic-wave-active material and from the layer of electrically conductive material by one of said at least one layer of magnetic-wave-inactive material.

2. The delay line of claim 1 wherein the yttrium iron garnet layers are disposed on opposite sides of a layer of magnetic-wave-inactive material comprising gadolinium gallium garnet.

3. In combination, a magnetic delay line comprising;
a layer of electrically conductive material;
at least one layer of magnetic-wave-inactive material;
a plurality of layers of magnetic-wave-active material disposed in stacked relation;

at least one of said layers of magnetic-wave-active material being spaced apart from another layer of magnetic-wave-active material and from the layer of electrically conductive material by one of said at least one layer of magnetic-wave-inactive material;

a plurality of magnets for establishing a magnetic bias field around said delay line, and;

said bias field having a gradient perpendicular to the surface of the layers of the magnetic-wave-active material.

4. A method of operating a magnetic delay line comprising the steps of:

providing a plurality of layers of magnetic-wave-active material disposed in stacked relation and spaced apart from each other by intervening layers of magnetic-wave-inactive material;

providing magnet means which produce a magnetic bias field that has a substantial intensity gradient;

positioning said stack in the vicinity of said magnet means where said magnetic field intensity gradient is substantially perpendicular to the surface of said layers;

placing first and second electrical conductors in driving and receiving relation to the delay line, respectively; and applying the signal to be delayed to the first conductor and taking the delayed signal from the second conductor.

5. A method of making a magnetic delay line structure comprising the steps of:

providing at least one layer of magnetic-wave-inactive material;

depositing a plurality of layers of magnetic-wave-active material simultaneously on opposite sides of said at least one layer of magnetic-wave-inactive material by liquid phase epitaxy;

providing a layer of magnetic-wave-propagation-modifying material, and;

arranging said at least one layer of magnetic-wave-inactive material, said plurality of layers of magnetic-wave-active material and said layer of magnetic-wave-propagation-modifying material in stacked relation with the plurality of layers of magnetic-wave-active material spaced apart from each other by intervening ones of said at least one layer of magnetic-wave-inactive material.

* * * * *